United States Patent
Berkstresser, IV et al.

[11] Patent Number: 6,083,283
[45] Date of Patent: *Jul. 4, 2000

[54] METHOD FOR REMOVING COLOR FROM IONICALLY DYEABLE POLYMERIC MATERIALS

[75] Inventors: Gordon A. Berkstresser, IV, Cantonment; Richard A. Dunbar, Gulf Breeze; George R. McLellan, Pensacola, all of Fla.; Le Moyne W. Plischke, Lillian, Ala.; Yiqi Yang, Charlottesville, Va.

[73] Assignee: Solutia Inc., St. Louis, Mo.

[*] Notice: This patent issued on a continued prosecution application filed under 37 CFR 1.53(d), and is subject to the twenty year patent term provisions of 35 U.S.C. 154(a)(2).

[21] Appl. No.: 09/019,911

[22] Filed: Feb. 6, 1998

Related U.S. Application Data

[63] Continuation-in-part of application No. 08/736,575, Oct. 24, 1996, abandoned
[60] Provisional application No. 60/005,948, Oct. 27, 1995.

[51] Int. Cl.[7] ............... C08J 11/08; C08J 11/24; C09B 67/54; D06L 3/00
[52] U.S. Cl. .................. 8/102; 8/440; 521/40; 521/40.5; 521/49.5; 528/491; 528/494; 528/495; 528/496; 528/499
[58] Field of Search ................ 8/440, 102; 521/40, 521/49.5, 40.5; 528/491, 494, 495, 496, 499

[56] References Cited

U.S. PATENT DOCUMENTS

| | | |
|---|---|---|
| 1,497,138 | 10/1924 | Farrow, Jr. et al. ............ 8/102 |
| 1,547,187 | 7/1925 | Weiss . |
| 1,791,990 | 2/1931 | Whitehead ..................... 8/102 |
| 2,639,278 | 5/1953 | Stott et al. . |
| 2,742,440 | 4/1956 | Stott et al. . |
| 2,840,606 | 6/1958 | Miller . |
| 2,872,420 | 2/1959 | Kruyff . |
| 2,921,038 | 1/1960 | Gunther . |
| 2,985,500 | 5/1961 | Janson et al. ................ 8/102 |
| 3,006,867 | 10/1961 | Simon . |
| 3,468,974 | 9/1969 | Elgin . |
| 3,562,373 | 2/1971 | Logrippo . |
| 3,591,325 | 7/1971 | Sapers ......................... 8/102 |
| 3,892,845 | 7/1975 | Cunningham et al. . |
| 3,908,680 | 9/1975 | Krezanoski . |
| 4,003,880 | 1/1977 | Sidebotham et al. . |

(List continued on next page.)

FOREIGN PATENT DOCUMENTS

| | | |
|---|---|---|
| 788009 | 6/1968 | Canada . |
| 603434 | 6/1994 | European Pat. Off. . |
| P 4014012 | 10/1991 | Germany . |
| 49-108198 | 10/1974 | Japan . |
| 51-17989 | 2/1976 | Japan . |
| 52-26555 | 2/1977 | Japan . |
| 54-99153 | 8/1979 | Japan . |
| 54-99173 | 8/1979 | Japan . |
| WO96/02590 | 2/1996 | WIPO . |

OTHER PUBLICATIONS

Battle et al. *Plastics Recycled by Selective Dissolution*, The DeWitt Conference (Mar. 25–27, 1992) (revised 1996).

(List continued on next page.)

*Primary Examiner*—Alan Diamond
*Attorney, Agent, or Firm*—Howrey Simon Arnold & White, LLP

[57] ABSTRACT

A method for removing color and extracting dyes from ionically dyeable polymeric materials is provided. The method includes contacting the ionically dyeable polymeric material with a swelling agent for the material under conditions sufficient to effect diffusion of the dye from the material. The process is especially useful for removing colors from ionically dyeable polymeric materials as part of a recycling process for such materials. Also, the extracted dye may be recovered for re-use as the swelling agent and contacting composition are substantially non-reactive with the dye.

57 Claims, 1 Drawing Sheet

U.S. PATENT DOCUMENTS

| | | |
|---|---|---|
| 4,013,575 | 3/1977 | Castrantas et al. . |
| 4,014,736 | 3/1977 | Sexton . |
| 4,020,020 | 4/1977 | Appleyard et al. . |
| 4,028,159 | 6/1977 | Norris . |
| 4,046,621 | 9/1977 | Sexton ........................................ 162/40 |
| 4,105,593 | 8/1978 | Stavrinou . |
| 4,116,851 | 9/1978 | Rupe et al. . |
| 4,118,187 | 10/1978 | Sidebotham et al. ........................ 8/102 |
| 4,137,393 | 1/1979 | Sidebotham et al. .................... 528/491 |
| 4,146,704 | 3/1979 | Seki et al. . |
| 4,158,646 | 6/1979 | Benkowski et al. . |
| 4,227,881 | 10/1980 | Fono ........................................... 8/102 |
| 4,238,281 | 12/1980 | Histed ....................................... 162/60 |
| 4,301,000 | 11/1981 | Rankin . |
| 4,518,459 | 5/1985 | Freis et al. . |
| 4,539,827 | 9/1985 | Klein et al. . |
| 4,546,128 | 10/1985 | Nakajima ................................. 523/222 |
| 4,594,371 | 6/1986 | Nauman .................................. 523/340 |
| 4,608,122 | 8/1986 | Klein et al. . |
| 4,666,961 | 5/1987 | Nauman .................................. 523/340 |
| 4,775,697 | 10/1988 | Schoenhard ............................... 521/48 |
| 4,783,193 | 11/1988 | Pensa .......................................... 8/102 |
| 5,061,735 | 10/1991 | Zielinski ................................ 521/46.5 |
| 5,085,734 | 2/1992 | Griggs ..................................... 162/19 |
| 5,145,616 | 9/1992 | Sadanobu et al. ...................... 264/29.2 |
| 5,164,043 | 11/1992 | Griggs et al. ............................. 162/57 |
| 5,164,044 | 11/1992 | Griggs et al. ............................. 162/57 |
| 5,169,876 | 12/1992 | Heitmann et al. ....................... 521/155 |
| 5,188,708 | 2/1993 | Griggs et al. ............................. 162/40 |
| 5,198,471 | 3/1993 | Nauman et al. ........................ 521/46.5 |
| 5,211,811 | 5/1993 | Griggs et al. ............................. 162/40 |
| 5,275,024 | 1/1994 | Parks ............................................. 68/9 |
| 5,278,282 | 1/1994 | Nauman et al. ......................... 528/497 |
| 5,294,384 | 3/1994 | David et al. ............................... 264/37 |
| 5,296,099 | 3/1994 | Griggs et al. ............................. 162/57 |
| 5,409,570 | 4/1995 | Griggs et al. ............................. 162/40 |
| 5,430,068 | 7/1995 | Subramanian ............................. 521/40 |
| 5,441,603 | 8/1995 | Griggs et al. ............................. 162/57 |
| 5,454,935 | 10/1995 | Magaraggia ............................. 209/169 |
| 5,456,725 | 10/1995 | Bruhnke ..................................... 8/403 |
| 5,466,335 | 11/1995 | Parks ........................................ 162/60 |
| 5,482,594 | 1/1996 | Salminen .................................. 162/60 |
| 5,840,773 | 11/1998 | Booij et al. ................................ 521/49 |
| 5,849,804 | 12/1998 | Sarian et al. ........................... 521/49.8 |

OTHER PUBLICATIONS

Nauman et al. *Rensselaer's Selective Dissolution Process For Plastics Recycling*, The Isermann Department of Chemical Engineering, Rensselaer Polytechnic Institute, (1996), Feb.

Chavan, Stripping Of Dyestuffs From Textiles, Silk & Rayon, vol. XII (2): 167–170, (1969), Feb.

Chemi–Washer, *Black Clawson Multi–Stage Horizontal Pulp Washer* Bulletin No. 66–SBB (Date Unknown).

Coffey, Characteristics Of The Chemi–Washer At G–P's Bellingham And Crossett Mills, Pulping Technology, Paper Trade Journal (Aug. 15, 1982).

Derwent Publication Listing (08254V) Jan., 1974.

Chemical Abstract Search, (1995) (Month Unknown).

Textile Technology Digest Search (date unknown).

Derwent Search, (Apr. 04, 1996).

Derwent Search, (Apr. 27, 1995).

Derwent Search, (Mar. 25, 1996).

Muguet et al., Ozone bleaching of recycled paper, Tappi Journal, vol. 76, No. 11, pp. 141–145 (1992) (month unknown).

Wagner, A new technology for recycling carpet waste, Chemiefasern/Textilindustrie, vol. 28/80, pp. 644–648 (Jul. 1978).

Carpets from plastic waste, Soviet Technology Alert, vol. 1, No. 3 (Mar. 1988).

Derwent Abstract JP 74001036 (Jan. 11, 1974).

Derwent Abstract DE 2425751 (Dec. 11, 1975).

Derwent Abstract DE 3816894 (Nov. 30, 1989).

Derwent Abstract JP 54117579 (Sep. 12, 1979).

Derwent Abstract JP 58119821 (Jul. 16, 1983).

Derwent Abstract JP 60185823 (Sep. 21, 1985).

Derwent Abstract JP 60206868 (Oct. 18, 1985).

Derwent Abstract JP 60219016 (Nov. 01, 1985).

Derwent Abstract JP 51017989 (Feb. 13, 1976).

Derwent Abstract JP 49108198 (Oct. 15, 1974).

Derwent Abstract JP 52026555 (Feb. 28, 1970).

FIG. 1

METHOD FOR REMOVING COLOR FROM IONICALLY DYEABLE POLYMERIC MATERIALS

This is a continuation-in-part of Application Ser. No. 08/736,575 filed Oct. 24, 1996, now abandoned which claims the benefit of Provisional Application Ser. No. 60/005,948, filed on Oct. 27, 1995.

BACKGROUND OF THE INVENTION

1. Field of the Invention

The present invention is directed to a method for removing color from ionically dyeable polymeric material. The present invention is also directed to a method for extracting dye from ionically dyeable polymeric material. More particularly, the present invention is directed to a method for recycling colored polymeric material which includes contacting the polymeric material with a swelling agent for the material to produce a decolored, ionically dyeable polymeric material and forming an article therefrom.

2. Background

As the amount of available landfill space decreases, and the number of articles manufactured from synthetic polymers increases, there exists an unmet need for environmentally responsible methods for disposal of these polymer containing articles. A welcome alternative to landfill disposal is recycling and reuse of the synthetic polymer material in products which may be the same as or entirely different from the original article.

One significant limitation to the utility of recycled synthetic polymer material is the imparted color. Colorants or dyes are commonly added to virgin polymers for both practical and aesthetic reasons. However, the colorant or dye may significantly impair the processability of or degrade the polymer during conventional recycling processes. Further, the presence of colorant or dye may limit the potential downstream uses of the recycled polymeric material as any color change desired in the downstream use could be limited if not impossible given the original article's color. In a worst case scenario, a article otherwise suitable for recycling would be rejected completely and deposited in a landfill simply because its color is undesirable or inappropriate for a particular downstream use.

Processes for stripping dyes from or decolorizing various materials are well known in the art. For example, U.S. Pat. No. 4,227,881 discloses a process for stripping dyes from textile fabric which includes heating an aqueous solution of an ammonium salt, a sulfite salt and an organic sulfonate to at least 140° F. (60° C.) and adding the dyed fabric to the heated solution while maintaining the temperature of the solution. In addition to the costly heating and temperature maintenance step, this process has the drawback of producing fabrics which after processing exhibit a remaining color depth. In U.S. Pat. No. 4,783,193 a process for stripping color from synthetic polymer products by contacting the colored polymer with a chemical system is disclosed. The described process uses unstable dispersions of alkyl halides and aqueous solutions of bleaching/oxidizing agents to which specified quantities of acids and surfactant/wetting agents are added. Among the drawbacks are the use of potentially hazardous halogens and the special provisions required to prevent escape of vapors which could cause environmental harm. Further, the use of the chemical system may restrict or eliminate the polymeric materials recyclability. In general, processes which utilize harsh stripping agents destroy the usefulness of the colorant thus generating a chemical waste stream that must be treated or disposed of in an environmentally conscious manner. These methods can also generate unremovable colorant fragments which limit the downstream recycleability and utility of the color-stripped material.

Thus an unmet need exists for a cost-effective and environmentally friendly process for removing color from synthetic polymer materials which completely removes the colorant from the material without degrading or otherwise decreasing the material's or the colorant's availability for recycling and re-use.

SUMMARY OF THE INVENTION

The present invention is directed to a cost-effective and environmentally friendly process for removing color, including dye-imparted color and stains, from colored ionically dyeable polymeric materials. The process includes contacting the colored material with at least one swelling agent under conditions sufficient to effect diffusion of the dye from the material. The process of the present invention is especially useful for quickly and thoroughly removing colors from ionically dyeable polymeric materials as part of a recycling process for such materials without substantially degrading either the material or the dye, thus allowing for their recovery and reuse.

In one embodiment of the invention, a process for recycling colored polymeric material comprises the step of contacting solid colored polymeric material with an aqueous $C_1$–$C_{10}$ alcohol solution at a temperature effective to cause swelling of the polymeric material, whereby colorant is removed from the polymeric material, producing a decolored polymeric material. This process is especially useful where the polymeric material is a polyamide, for example an ionically dyed polyamide, such as post-consumer carpet that contains dyed nylon fibers.

In this embodiment of the invention, the colored polymeric material preferably is contacted with the aqueous alcohol solution at a temperature between about 90–102° C. Optionally, after the aqueous alcohol solution is contacted with the polymer, the solution can be cooled to a temperature from about 20–75° C., preferably ambient temperature. If the solution contains a surfactant in an effective amount, e.g., from about 2–5%, the solution will then separate into distinct aqueous and alcohol phases, with the dye or other colorant primarily in the alcohol phase.

The aqueous alcohol solution preferably comprises at least about 50% by weight water and at least one alcohol selected from the group consisting of benzyl alcohol, methanol, ethanol, 1- and 2-propanol, 1-butanol, and cyclohexanol. In addition, the aqueous alcohol solution preferably also comprises a surfactant at a concentration effective to cause the aqueous alcohol solution to be a single phase at the temperature at which that solution is contacted with the colored polymeric material, and to separate into two phases at a reduced temperature between about 20–75° C. Many surfactants could be used for this purpose.

In one specific embodiment, the process can also include the additional step of recovering colorant from the aqueous alcohol solution. Alternatively, or in addition thereto, the process can include the step of recovering the decolored polymeric material.

Optionally the decolored polymeric material can be washed subsequently with a polar liquid. Preferred washing liquids include water, $C_1$–$C_4$ aliphatic alcohols, $C_3$–$C_6$ ketones, and mixtures thereof.

One particular embodiment of the invention is a process for recycling colored polyamide material, comprising (1)

contacting solid colored polyamide material with an aqueous solution that comprises (a) at least about 50% by weight water, (b) at least one $C_1$-$C_{10}$ alcohol, (c) a surfactant in an amount effective to cause the solution to form a single phase at a temperature between about 90–102° C., and to form two phases at a temperature between about 20–75° C., and (d) a pH modifying agent effective to adjust the pH of the solution to at least about 7, more preferably to at least about 11; thereby causing swelling of the polyamide material and removal of colorant from the polyamide material, producing a decolored polyamide material; and (2) cooling the aqueous alcohol solution to a temperature between about 20–75° C., whereby the solution separates into an aqueous phase and an alcohol phase, more than 80% by weight of the colorant removed from the polyamide being contained in the alcohol phase.

If the colored polymeric material to be treated is post consumer carpet containing colored nylon fibers, the process can optionally also comprise one or more of the preliminary steps of (1) physically separating carpet having nylon face fibers from carpet having non-nylon face fibers; (2) prepurifying the carpet having nylon face fibers from step (1) by mechanically separating dirt and other loosely-attached foreign materials and washing the carpet with detergent and water; (3) separating the nylon face fibers from the backing of the carpet by a method selected from the group consisting of shearing, cutting with a hot wire, cutting with a laser, and combinations thereof; and (4) grinding, cutting, or shearing the colored nylon fibers into particles having reduced size.

The present invention has a number of advantages over prior art decolorization methods. The present invention does not substantially degrade the polymer and therefore recovered polymer can be used in new polymeric materials or articles without the need for repolymerization. The present invention can thoroughly remove a wide variety of color-imparting agents from the polymeric material, even if the colorants are deeply penetrated into the polymeric material or are in the form of large aggregates inside voids in the polymeric material.

Because the process of the present invention does not substantially degrade the dye or other colorant in the process of separating it from the polymer, the colorant itself can be recovered and reused. Therefore, in different embodiments of the invention, the process might involve recovering only the polymer, recovering only the colorants, or recovering both the polymer and the colorants for separate reuse.

BRIEF DESCRIPTION OF THE DRAWINGS

These and other features of the present invention are more fully set forth in the following description of illustrative embodiments of the invention. The description is presented with reference to the accompanying drawings in which.

DETAILED DESCRIPTION OF SPECIFIC EMBODIMENTS

The following terms and phrases are used herein and are intended to have the following meaning:

"color" is defined to include intentionally imparted visual appearance such as color imparted by dyes and accidentally imparted visual appearance such as stains and the like;

"colorant" is defined as any dye, pigment or colored composition or combinations thereof that may intentionally or accidentally color or stain ionically dyeable polymeric materials;

"dye" is defined as an organic material which imparts color to a polymer and which chemically bonds to the polymer primarily by ionic mechanisms;

"ionically dyeable polymeric material" is defined as any known ionically dyeable polymer, copolymer, terpolymer and the like as well as the blends or alloys thereof;

"swelling agent", is defined as a material capable, under specified conditions, of interrupting the molecular forces within the polymer matrix resulting in an opening of its structure.

All percentages herein are by weight unless otherwise specified.

The process of the present invention includes contacting a colored ionically dyeable polymeric material with at least one swelling agent under conditions so as to effect the diffusion of a dye or other colorant from the polymeric material. The amount of the swelling agent and the conditions under which the contacting takes place are selected so that neither the polymeric material nor the dye undergo substantial destruction or degradation. In one embodiment, the amount of swelling agent and the conditions are selected so that the general form or shape of the polymeric material is unaffected. In another embodiment, the swelling agent and the conditions are selected so that the polymer is solvated, and can be recovered from the swelling agent. ionically dyeable polymeric materials for which the process of the present invention may be applied include polyamides, particularly nylons, more particularly nylon 6,6, as well as acrylics. Colored ionically dyeable polymer materials of the present invention are ionically dyeable polymeric materials modified by at least one dye or other colorant.

Dyes for which the process of the present invention is particularly useful include acid dyes. Other dyes can also be removed using the process of the present invention. Colorants for which the process of the present invention is useful for include the above mentioned dyes, but also natural and synthetic pigments, such as carbon black or colored transition metal oxides, or colored compositions that may stain the ionically dyeable polymeric material. Examples of such colored compositions include common food items such as coffee, fruit and vegetable material, juices and extracts, red wine and the like, natural and synthetic inks, and other common staining items.

The swelling agent used in the process of the present invention should be capable of interrupting the molecular forces within the polymeric material matrix resulting in an opening of its structure. In one embodiment of the present invention in which nylon 6,6 is the ionically dyeable polymeric material, the swelling agent may be any material known to be capable of swelling nylon 6,6. Suitable swelling agents for this embodiment include $C_1$ to $C_{10}$ alcohols and more particularly swelling agents include alcohols selected from the group including benzyl alcohol, methanol, ethanol, 1-, and 2-propanol, 1-butanol, cyclohexanol and the like, as well as mixtures, solutions, emulsions or dispersions thereof. Benzyl alcohol is a particularly preferred swelling agent when the ionically dyeable polymeric material is nylon 6,6. Another particularly preferred swelling agent that solvates the polymer under conditions of elevated temperature and pressure, and precipitates or recrystallizes a substantially pure polymer under a ambient pressure and temperature is ethanol. Yet a third particularly preferred swelling agent that solvates the polymer under conditions of elevated temperature and pressure and precipitates the polymer upon cooling and removal of pressure is n-butanol.

In certain embodiments of the present invention, the swelling agent may be part of a contacting composition in which the swelling agent is at least partially miscible with the other components in the contacting composition during the contacting step. One preferable contacting composition includes an aqueous component in addition to the swelling agent. More preferably, the swelling agent is present in an amount of at least about 10% by weight based on the total weight of the contacting composition. It should be apparent to one of ordinary skill in the art that the exact amount of swelling agent utilized in the contacting composition will vary depending upon the conditions, such as temperature, pressure, pH value, residency time and so forth, utilized during the contacting step. In embodiments where the dye is to be re-used, it should also be kept in mind that the contacting composition should preferably be substantially non-reactive with the dye.

It was unexpectedly discovered that a dye or other colorant can be substantially removed from ionically dyeable polymeric materials by contacting the materials with a suitable swelling agent under conditions which effect the diffusion of dye from the polymer. Thus the swelling agent in the contacting composition and the conditions of the contacting step should allow for the diffusion of the dye or colorant from the ionically dyeable polymeric material into the contacting composition. Further these conditions allow for the separation of the decolorized polymeric material from the dye or colorant containing contacting composition. In one preferred embodiment, the ionically dyeable polymeric material is colored by at least one dye which once removed from the polymer using the process of the present invention can be recovered from the contacting composition and the dye recycled and reused. In another embodiment of the present invention, the ionically dyeable polymeric material is colored by a mixture of dyes and colorants in the form of stains. Upon removal from the polymer using the process of the present invention, the polymeric material is recycled or reused and a concentrated mixture of dyes and various colorants is recovered from the contacting composition after which it is disposed of in an environmentally conscious manner. In a third embodiment of the present invention, the polymer is selectively solvated by the swelling agent, the polymer containing contacting composition is separated from the insoluble material, and a substantially pure polymer material is recovered by precipitation or recrystallization.

As noted above, the conditions of the contacting step should provide a driving force or mechanism by which the diffusion of the dye from the polymer to the contacting composition is favored. One manner of doing this is to formulate the contacting composition so that during the contacting step the contacting composition has a suitable pH value. In an embodiment wherein the colorant is an acid dye, the contacting composition is formulated to include a pH modifying agent so that the contacting step is preferably conducted at a pH value of at least about 7 and more preferably at a pH value of at least about 11.

Suitable pH modifying agents should be selected so as to be at least partially soluble in the contacting composition and be present in an amount sufficient to maintain the desired pH value. In embodiments where the contacting step is conducted at a pH value of at least about 7, suitable pH modifying agents may be selected from the group including alkali metal hydroxides, alkali metal oxides, trialkylalcohol amines, alkyldiamines, dialkylamides, and mixtures thereof In a more preferred embodiment, the pH modifying agent is selected from the group including sodium hydroxide, potassium hydroxide, sodium oxide, potassium oxide, trialkylalcohol amines having $C_1$ to $C_4$ alkyl groups, $C_2$ to $C_8$ alkyldiamines, dialkylacetamides having $C_1$ to $C_4$ alkyl groups and mixture thereof.

It should be appreciated by one of ordinary skill in the art that the amount of swelling agent and the amount of pH modifying agent in the contacting composition will depend upon the desired conditions of the contacting step and with each other. Further variables such as the polymeric material, the nature and amounts of the dye(s) or colorant(s) present in the polymer, the depth of color shade and the like will need to be considered. However, such optimization of exact amounts and conditions should be apparent given the present disclosure, and as such are considered to be within the scope of the present invention.

The temperature and pressure at which the contacting step should be carried out will depend upon the polymer or blend of polymers that constitute the colored ionically dyeable polymeric material. It is preferred that the contacting step be carried out at a temperature of at least above the solution glass transition temperature ($T_g$) of the colored polymeric material in the process environment (i.e., in the presence of the liquid contacting composition). It should be recognized that the glass transition temperature changes when liquid is contacted with the polymer. In one preferred embodiment the temperatures are at least about 10° C. and no greater than about 250° C. In another preferred embodiment, the contacting step is carried out at a temperature of at least about 20° C., and more particularly at temperature of at least about 97° C.

The contacting step is preferably performed at ambient or greater pressure. Applied pressure may be that provided by an inert gas, such as nitrogen or argon, or it may be the pressure generated by the vaporization of the liquids in the contacting composition. In one embodiment, the contacting step is carried out at a pressure of about 1 atmosphere to about 2 atmospheres and more preferably a pressure of about 1.0 atmosphere to about 1.5 atmospheres. In another embodiment the pressure was that generated by the vaporization of heating the contacting composition in a sealed container.

As will be apparent to one skilled in the art, the combined effect of temperature and pressure and the formulation of a suitable contacting composition can be used to control the processes of the present invention. Thus variation and optimization of the contacting composition, and the temperature and pressure conditions of the contacting process in order to maximize the decolorizing effect of the contacting composition are considered to be within the scope of the present invention. It should be noted that if the process is conducted at ambient pressure, only swelling agents such as alcohols that boil at relatively high temperatures can be used.

The form of the ionically dyeable polymeric material may be selected or modified to maximize the surface area of the ionically dyeable material available for contact with the contacting composition. The residence time for contacting the ionically dyeable polymeric material with the contacting composition during the contacting step may be controlled to ensure the desired degree of color removal. Suitable residence times for the contacting step will depend upon the conditions of the contacting step. The preferred residence time is at least about ½ minute and no greater than about 20 minutes, more preferably about ½ to 1 minute. The contacting step in these embodiments may include a plurality of contacting stages wherein the ionically dyeable polymeric material is contacted with the swelling agent at each stage. In embodiments where the solvation of the polymeric material is desired, a preferred residence time may be about 10 minutes or greater. Therefore one skilled in the art would appreciate that the residence time varies depending on the temperature, pressure and other conditions in order to achieve the results of the present invention.

Preferably, the contacting step is conducted in the presence of at least one surfactant, and more preferably in an amount of at least 2% by weight based on the total weight of the contacting composition. Suitable surfactants include nonionic, anionic, and cationic surfactants. Particularly preferred surfactants include trialkylalcohol phosphate salts such as the potassium salt of tridecylalcohol phosphate to which 6 moles of ethylene oxide has been added. This compound is commercially available from Ethox Corp. as ETHFAC 363 (TM). In embodiments of the process where an alcohol in the contacting composition is not readily soluble in water, the surfactant may be combined with the swelling agent as part of the contacting composition such that the swelling agent is substantially miscible in the contacting composition during the contacting step.

In one embodiment, the process of the present invention further includes recovering the dye from the contacting composition for recycling and re-use. Thus it has been unexpectedly discovered that the contacting step can result in a dye-containing contacting composition from which the dye can be recovered and subsequently re-used to again color polymeric materials. Suitable techniques or methods of recovery include, for example, ion exchange, ultrafiltration, selective precipitation, counter current extraction or other extraction techniques and the like. Choice of the appropriate recovery method will depend on the characteristics of the dye and the formulation of the contacting composition and will be readily apparent to one of ordinary skill in the art.

One of the several aspects of the process of the present invention, is the selection of the nature and amount of the swelling agent and optimization of the conditions under which the contacting step is conducted so as to allow the swelling of the ionically dyeable polymeric material without substantial dissolution or degradation of the material during the contacting step. The term "swell", as utilized herein, is defined as the opening of the ionically dyeable polymeric material matrix. When conducted in accordance to this embodiment, the general shape and integrity of the form of the ionically dyeable polymeric material, for example fiber, molded part or the like, is maintained during the contacting step. Again, it should be appreciated by one of ordinary skill in the art that the amount of swelling agent and the conditions of the contacting step may vary as they are influenced by each other as well as external variables such as the ionically dyeable polymeric material, the nature of the dye(s) or colorants present in the polymeric material, the color, and the depth of color shade and the like as noted above.

Another aspect of the process of the present invention permits the rapid extraction of dyes and other colorants thus substantially removing the color from ionically dyeable polymeric materials without the need for harsh stripping agents. Stripping agents are defined herein as materials which oxidize, reduce or otherwise destroy the dye chromophore. As noted above, because of the highly reactive chemical nature of such stripping agents, their use can limit or prevent the recycling and reuse of the resulting decolored polymeric material. The contacting step in the process of the present invention is preferably conducted in the absence of such stripping agents. Thus the resulting polymeric material can fully replace or be blended with virgin polymer for use in articles that conventionally decolorized polymeric material cannot presently be used.

The process of the present invention may further include a washing step, wherein any residual dye, colorant, or swelling agent is removed. Suitable washing agents should at least partially solubilize the residual dye, colorant or swelling agent without harm to the decolorized ionically dyeable polymeric material. Washing agents should be polar liquids and preferably are selected from the group including water, $C_1$ to $C_4$ aliphatic alcohols, $C_3$ to $C_6$ ketones and mixtures thereof and more preferably selected from the group including water, acetone and mixtures thereof.

The contacting step may be performed using a variety of techniques that will be apparent to one of ordinary skill in the art. Such techniques include immersing the ionically dyeable polymeric material in the swelling agent, applying an effective amount of the swelling agent onto the polymeric material, coating an effective amount of swelling agent onto the polymeric material, spraying an effective amount of swelling agent onto the polymeric material and other similar such techniques. Further the contacting step may be carried out in lots in a batch-wise manner or it may be carried out in a continuous manner.

Figure 1:
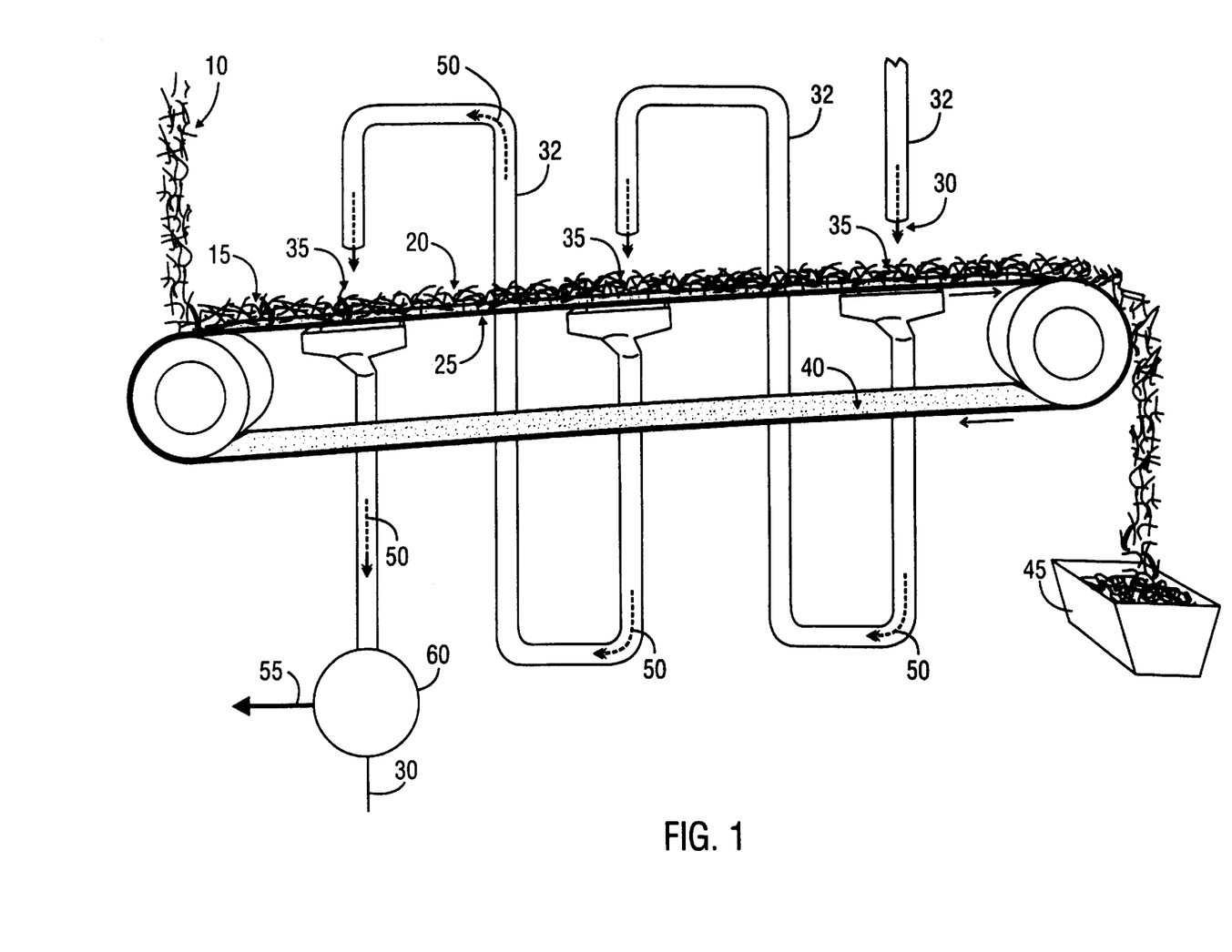
FIG. 1 is an illustration of an embodiment of a system suitable for practicing the process of the present invention.

An embodiment of a system useful for performing the process of the present invention in a continuous manner is illustrated in FIG. 1. In the embodiment shown, the process includes providing a colored ionically dyeable polymeric material 10, shown here as fibers modified with at least one dye, forming a loosely organized mat 15 of polymeric material 10 having a top 20 and a bottom 25, and contacting the mat 15 with a contacting composition 30 which includes a swelling agent at a plurality (exemplified herein as three) of stages 35 so as to swell and decolorize the colored ionically dyeable polymeric material. Preferably and as shown, the contacting composition 30 is supplied, collected and recirculated by suitable means such as piping 32 so as to contact the mat 15 of polymeric material at each successive stage 35 in a counter current direction. The mat 15 of polymeric material may be formed or placed on a traveling belt 40 which is at least partially permeable to, but not chemically affected by, the contacting composition 30. The substantially decolorized polymeric fibers are collected at collector 45 while the dye 55 in the dye-containing contacting composition 50 is recovered by a suitable separator 60 as described above. Once the dye is separated from the contacting composition, the contacting composition is reused in the process.

Similar suitable devices and techniques for performing the process of the present invention as described above are known in the diverse art of paper pulp washing. Such technology is exemplified in U.S. Pat. Nos.: 5,275,024; 4,539,827; 4,046,621; and, the references cited therein the contents of which are hereby incorporated by reference. A commercially available example is sold under the tradename CHEMIWASHER which is a horizontal pulp washer, commercially available from Black-Clawson Pulp and Paper Machinery Group.

The method of the present invention can use a contacting composition (also referred to as a decolorization formulation) that will remain a single liquid phase during the treatment of the colored polymeric material and subsequent recovery steps. However, it is preferred to use a decolorization formulation that will be a single liquid phase at the temperature at which the polymeric material is treated, but will form two distinct liquid phases at the lower temperature at which the subsequent recovery steps are conducted. Such a two-phase decolorization formulation makes recovery of the dye and/or polymer simpler.

An example of a decolorization formulation that will remain a single phase at both temperatures is:
  water 60%
  benzyl alcohol 20%
  aminomethyl propanol (for pH adjustment) 10%
  Ethfac 363 (surfactant) 10%
(Ethfac 363 is tridecylalcohol phosphate with 6 moles ethylene oxide, potassium salt.)

An example of a suitable two phase solution is similar to the above solution but with the Ethfac content reduced to 5% and the water content increased to make up the difference. This solution forms two phases below about 35° C. Lower levels of surfactant increase the temperature at which the conversion from two phase to single phase occurs. However, complete elimination of the surfactant can result in two phases forming at the preferred polymer treatment temperature (e.g., about 100° C.), which can cause the polymer to dissolve in the alcohol, which is not desired.

The preferred goal in this embodiment of the invention is to use a decolorization formulation that will form two distinct phases at about ambient temperature for easy recovery of the dye and/or the polymer in the alcohol or aqueous phases, respectively. The dye can be salted out from the alcohol by the addition of a salt such as NaCl, and separation can be accomplished by decanting.

In an especially preferred embodiment, dyed nylon fiber is contacted with the decolorization formulation at temperature of at least about 98° C. for a period of about 0.5–5 minutes. For batch operation, a series of two or three treatments will improve the final polymer product color. A continuous counterflow operation, as described above, is preferred. The addition of sodium hydrosulfite at 0.2% of solution, or at higher levels as an after treatment wash, can also enhance final polymer color. However, the sodium hydrosulfite degrades rapidly in water and loses its effectiveness in only 2–3 minutes.

The following examples are included to demonstrate preferred embodiments of the invention. It should be appreciated by those of skill in the art that the techniques disclosed in the examples which follow represent techniques discovered by the inventors to function well in the practice of the invention, and thus can be considered to constitute preferred modes for its practice. However, those of skill in the art should, in light of the present disclosure, appreciate that many changes can be made in the specific embodiments which are disclosed and still obtain a like or similar result without departing from the spirit and scope of the invention.

EXAMPLES 1–12

I. Sample Preparation

3"×3" samples used in the following decolorization examples were cut from a 2'×30' section of greige carpet constructed with nylon 6,6 fibers that was dyed to a deep chocolate brown shade on commercial pilot-scale equipment using the following dye formulation at standard nylon 6,6 acid dyeing conditions:

| Dye | Dye Type |
| --- | --- |
| 0.2% C.I. Acid Blue 277 | Anthraquinone |
| 0.3%. C.I. Acid Red 361 | Mono-azo |
| 0.4% C.I. Acid Orange 156 | Di-azo |

These dyes are commonly used in the carpet industry as a wide variety of colors can be obtained by varying the individual and total dye concentrations.

II. Decolorization/Dye Extraction Procedure

Twelve separate carpet fiber samples were placed in various decolorization test formulations, shown in Table 1 below, at a boil and at a pre-determined liquor to goods ratio, generally 50:1. With a 3"×3" sample weighing about 8 g and at a 50:1 liquor to goods ratio, the weight of test formulation was about 400 g. Each test formulation containing the sample was held at the boil for 5 minutes. The degree of decolorization was qualitatively rated as A (excellent), B (good), C (fair), D (poor) or E (bad) by visual observation. The results are set forth in Table 1 below. A grade of C or above indicates an amount of color removal desirable for re-use of the material.

III. Test Standardization

In order to provide a quantitative standard for decolorization testing, random test samples from the above procedure were measured for residual color using a commercially available reflectometer, assigning the reflectance or Delta E of the original brown carpet to zero and relating the samples to this item. Setting the untreated control carpet at a Delta E of zero, an undyed or greige carpet exhibited a Delta E of 67, with the samples being within this range. Visually, the following relationship of apparent process effectiveness to Delta E was established:

| Delta E Range | Grade | Process |
| --- | --- | --- |
| <40 | E | Bad |
| 41–54 | D | Poor |
| 55–57 | C | Fair |
| 58–60 | B | Good |
| >60 | A | Excellent |

TABLE 1

DECOLORIZATION FORMULATION EXAMPLES

| COMPONENT, wt % | 1 | 2 | 3 | 4 | 5 | 6 | 7 | 8* | 9 | 10 | 11 | 12 |
| --- | --- | --- | --- | --- | --- | --- | --- | --- | --- | --- | --- | --- |
| Isopropyl Alcohol | — | — | — | — | — | 20 | — | — | — | — | — | — |
| Benzyl Alcohol | 10 | 10 | 20 | 20 | 20 | — | 10 | 20 | — | — | — | — |
| Polyethylene Glycol (PEG) 200 | 10 | 10 | 5 | — | — | — | 10 | — | 20 | — | — | — |
| Aminomethyl Propanol | — | — | — | — | 10 | — | — | — | — | — | 10 | — |
| Triethanol Amine | — | — | — | 10 | — | — | — | — | — | — | — | — |
| ETHFAC 363** | — | — | 10 | 10 | 10 | — | 2 | — | — | — | 10 | — |
| NaOH | 2 | — | — | — | — | 2 | 2 | 2 | 2 | — | — | — |
| Hexamethylene Diamine (HMD) | — | 4 | 5 | — | — | 4 | — | — | — | — | — | 5 |
| Diamethyl Acetamide (DMAC) | — | — | — | — | — | — | — | — | — | 10 | — | — |

TABLE 1-continued

DECOLORIZATION FORMULATION EXAMPLES

| COMPONENT, wt % | 1 | 2 | 3 | 4 | 5 | 6 | 7 | 8* | 9 | 10 | 11 | 12 |
|---|---|---|---|---|---|---|---|---|---|---|---|---|
| N-Methyl Pyrrolidinone | — | — | — | — | — | — | — | — | — | — | 20 | — |
| Butyral Lactone | — | — | — | — | — | — | — | — | — | — | — | 20 |
| Water | 78 | 76 | 60 | 60 | 60 | 73 | 76 | 78 | 78 | 88 | 60 | 75 |
| Na Hydrosulfite | 0.1 | 0.1 | — | — | — | — | — | 0.2 | 0.2 | — | — | — |
| pH | 11.5 | 11.5 | 11.5 | 11.5 | 11.5 | 11.5 | 11.5 | 11.5 | 11.5 | 11.5 | 11.5 | 11.5 |
| COLOR GRADE | A | B | B | B | B | C | C | D | D | E | E | E |

*Swelling agent not miscible in composition.
**Tridecylalcohol Phosphate + 6 Moles Ethylene Oxide, Potassium Salt (Ethox Corp.)

EXAMPLE 13

A room temperature decolorization formulation was prepared containing:

water 67% benzyl alcohol 20% aminomethyl propanol 10%

Ethfac 363 3%

This formulation is a single phase above 75° C. The pH of this solution was 11.0. A sample of dark brown carpet was treated at 100° C. in the above-described solution for five minutes. After cooling to room temperature, it was observed that the benzyl alcohol, containing most of the dye, made up a distinct bottom layer. The upper, aqueous layer did not clear up completely (i.e., some dye remained in the aqueous phase) even after standing overnight.

EXAMPLE 14

The carpet sample was removed from a two-phase solution prepared as in Example 13, and sulfamic acid was added to the solution to reduce its pH to 1.5. Good dye separation was obtained from the aqueous phase to the alcohol phase. The density of the aqueous phase appeared to be higher than in Example 13; the alcohol phase was now on top of the aqueous phase.

EXAMPLE 15

The carpet sample was removed from a two-phase solution prepared as in Example 13, and the solution was then adjusted in pH to 7.0. The results were the same as in Example 14 except that the separation of the two phases occurred more slowly. Also, it appeared that the aqueous phase in this example did not increase in density as much as the aqueous phase in Example 14.

EXAMPLE 16

The carpet sample was removed from a two-phase solution prepared as in Example 13, and NaCl was then added to the solution, since an increase of density in the aqueous phase in the previous example appeared to improve the separation of the aqueous and alcohol phases and the rate of separation. The separation of the two phases was excellent both in terms of the dye concentrating in the alcohol phase and in terms of the rate at which this separation occurred. The aqueous phase density was very high, allowing the benzyl alcohol to float on top of the aqueous phase, with all dye concentrated in this top layer. Thus, this procedure allows for easier dye and alcohol recovery during processing.

The process and composition of the present invention are particularly useful in the recycling of thermoplastic materials. It has been unexpectedly discovered that ionically dyeable polymeric materials treated according to the present invention may be reutilized in the same or different applications without exhibiting color pollution, degradation or other detrimental effect from the treatment. Treated materials may be utilized in place of or blended with virgin thermoplastics in any known thermoplastics applications. A preferred process of the present invention for forming an article therefore includes, after the contacting step, forming an article from the polymeric material. The article forming step may include melting the treated material and may further include molding and solidifying the melted material or extruding the melted material to form fiber which may be dyed. Techniques for article forming are conventional and well known in the art.

While the compositions and methods of this invention have been described in terms of preferred embodiments, it will be apparent to those of skill in the art that variations may be applied to the process described herein without departing from the concept, spirit and scope of the invention. All such substitutions and modifications apparent to those skilled in the art are deemed to be within the spirit, scope and concept of the invention as it is set out in the following claims.

What is claimed is:

1. A process for removing colorants from an ionically dyeable polymeric material, comprising:

contacting the polymeric material with a swelling agent under conditions sufficient to promote substantial diffusion of the colorants out of the polymeric material without substantial dissolution or degradation of the polymeric material; where the polymeric material is selected from the group consisting of polyamides and acrylics.

2. The process of claim 1 wherein the swelling agent is part of an aqueous contacting composition, the contacting composition comprising water, swelling agent and a pH modifying agent and wherein said swelling agent is substantially miscible in said contacting composition during the contacting.

3. The process of claim 2 wherein the swelling agent is a $C_1$ to $C_{10}$ alcohol.

4. The process of claim 3 wherein the swelling agent is present in an amount of at least about 10% by weight of the contacting composition.

5. The process of claim 2 wherein the pH modifying agent is selected from the group consisting of alkali metal hydroxides, alkali metal oxides, trialkylalcohol amines, alkyldiamines, dialkylamides and mixtures thereof.

6. The process of claim 2 wherein the contacting composition is substantially non-reactive with the colorants.

7. The process of claim 2 wherein the contacting composition further comprises a surfactant.

8. The process of claim 1 wherein the contacting is conducted at a temperature of at least about the solution glass transition temperature of the polymeric material.

9. The process of claim 1 wherein the contacting is conducted at a pH value of at least about 7.

10. The process of claim 1 wherein the contacting is conducted at a pH value of at least about 11.

11. A process for removing colorants from an ionically dyeable polymeric material, comprising:
contacting the polymeric material with a swelling agent at a temperature of at least about the solution glass transition temperature of the polymeric material to promote substantial diffusion of the colorants out of the polymeric material without substantial dissolution or degradation of the polymeric material; wherein the polymeric material is selected from the group consisting of polyamides and acrylics.

12. The process of claim 11 wherein the swelling agent is part of an aqueous contacting composition, the contacting composition comprising water, swelling agent and a pH modifying agent and wherein said swelling agent is substantially miscible in said contacting composition during the contacting.

13. The process of claim 12 wherein the swelling agent is a $C_1$ to $C_{10}$ alcohol.

14. The process of claim 13 wherein the swelling agent is present in an amount of at least about 10% by weight of the contacting composition.

15. The process of claim 12 wherein the pH modifying agent is selected from the group consisting of alkali metal hydroxides, alkali metal oxides, trialkylalcohol amines, alkyldiamines, dialkylamides and mixtures thereof.

16. The process of claim 12 wherein the contacting composition is substantially non-reactive with the colorants.

17. The process of claim 12 wherein the contacting composition further comprises a surfactant.

18. The process of claim 11 wherein the contacting is conducted at a pH value of at least about 7.

19. The process of claim 11 wherein the contacting is conducted at a pH value of at least about 11.

20. A process for extracting a dye from an ionically dyeable polymeric material comprising:
contacting the polymeric material with a swelling agent under conditions sufficient to promote substantial diffusion of the dye out of the polymeric material without substantial dissolution or degradation of the polymeric material; where the polymeric material is selected from the group consisting of polyamides and acrylics.

21. The process of claim 20 wherein the swelling agent is part of an aqueous contacting composition, the contacting composition comprising water, swelling agent and a pH modifying agent and wherein said swelling agent is substantially miscible in said contacting composition during the contacting.

22. The process of claim 21 wherein the swelling agent is a $C_1$ to $C_{10}$ alcohol.

23. The process of claim 22 wherein the swelling agent is present in an amount of at least about 10% by weight of the contacting composition.

24. The process of claim 21 wherein the pH modifying agent is selected from the group consisting of alkali metal hydroxides, alkali metal oxides, trialkylalcohol amines, alkyldiamines, dialkylamides and mixtures thereof.

25. The process of claim 21 wherein the contacting composition is substantially non-reactive with the dye.

26. The process of claim 21 wherein the contacting composition further comprises a surfactant.

27. The process of claim 20 wherein the contacting is conducted at a temperature of at least about the solution glass transition temperature of the polymeric material.

28. The process of claim 20 wherein the contacting is conducted at a pH value of at least about 7.

29. The process of claim 20 wherein the contacting is conducted at a pH value of at least about 11.

30. The process of claim 20 wherein the contacting is conducted under conditions sufficient to promote substantial diffusion of the dye out of the polymeric material without the substantial degradation of the dye.

31. The process of claim 30 further comprising the step of recovering the dye.

32. A process for recycling a colored ionically dyeable polymeric material comprising:
providing an ionically dyeable polymeric material modified with at least one colorant, where the polymeric material is selected from the group consisting of polyamides and acrylics;
contacting said polymeric material with at least one swelling agent under conditions sufficient to substantially remove the colorant from the polymeric material without substantial dissolution or degradation of the polymeric material thereby giving a substantially colorant free polymeric material; and,
forming an article from the substantially colorant free polymeric material.

33. The process of claim 32 wherein the contacting is carried out at a temperature of at least about the glass transition temperature of the polymeric material.

34. The process of claim 33 wherein the contacting is carried out at a pH value of at least about 7.

35. The process of claim 33 wherein the contacting is carried out at a pH value of at least about 11.

36. The process of claim 34 further comprising washing the substantially colorant free polymeric material with a washing agent so as to remove residual colorant and swelling agent.

37. The process of claim 36 wherein the article formed from the substantially colorant free polymeric material is a fiber.

38. The process of claim 36 wherein the colorant is a dye and the contacting and washing are carried out under conditions to promote substantial diffusion of the dye out of the polymeric material without substantial degradation of the dye.

39. The process of claim 38 further comprising separating the dye from the swelling agent, recycling the swelling agent back into the process and reusing the dye to color ionically dyeable polymeric materials.

40. A process for recycling colored polymeric material, comprising
contacting solid colored polyamide or acrylic polymeric material with an aqueous $C_1$–$C_{10}$ alcohol solution at a temperature effective to cause swelling of the polymeric material without substantial dissolution or degradation of the polymeric material, whereby colorant is removed from the polymeric material, producing a decolored polymeric material.

41. The process of claim 40, where the polymeric material is a polyamide.

42. The process of claim 40, where the solid colored polymeric material is an ionically dyed polyamide.

43. The process of claim 40, where the colored polymeric material is contacted with the aqueous $C_1$–$C_{10}$ alcohol solution at a temperature between about 90–102° C.

44. The process of claim 40, where the colored polymeric material is contacted with the aqueous $C_1$–$C_{10}$ alcohol solution at a temperature of about 97° C. or higher.

45. The process of claim 40, where the aqueous alcohol solution comprises at least one alcohol selected from the group consisting of benzyl alcohol, methanol, ethanol, 1-propanol, 2-propanol, 1-butanol, and cyclohexanol.

46. The process of claim 40, where the aqueous alcohol solution further comprises a surfactant at a concentration effective to cause the aqueous alcohol solution to be a single phase at the temperature at which that solution is contacted with the colored polymeric material, and to separate into two phases at a temperature between about 20–75° C.

47. The process of claim 40, further comprising the step of recovering colorant from the aqueous alcohol solution.

48. The process of claim 40, further comprising the step of recovering the decolored polymeric material.

49. The process of claim 40, further comprising the step of washing the decolored polymeric material with a polar liquid.

50. The process of claim 49, where the polar liquid is selected from the group consisting of water, $C_1$–$C_4$ aliphatic alcohols, $C_3$–$C_6$ ketones, and mixtures thereof.

51. The process of claim 49, where the polar liquid is a mixture of acetone and water.

52. The process of claim 40, where the aqueous alcohol solution comprises at least about 50% by weight water.

53. A process for recycling colored polyamide material, comprising contacting solid colored polyamide material with an aqueous solution that comprises (a) at least about 50% by weight water, (b) at least one $C_1$–$C_{10}$ alcohol, (c) a surfactant in an amount effective to cause the solution to form a single phase at a temperature between about 90–102° C., and to form two phases at a temperature between about 20–75° C., and (d) a pH modifying agent effective to adjust the pH of the solution to at least about 7; thereby causing swelling of the polyamide material and removal of colorant from the polyamide material, producing a decolored polyamide material; and cooling the aqueous alcohol solution to a temperature between about 20–75° C., whereby the solution separates into an aqueous phase and an alcohol phase, more than 50% by weight of the colorant removed from the polyamide being contained in the alcohol phase.

54. The process of claim 53, where the pH modifying agent is effective to adjust the pH of the solution to at least about 11.

55. The process of claim 53, where, after cooling, more than 80% by weight of the colorant removed from the polyamide is contained in the alcohol phase.

56. The process of claim 1 wherein the colorants comprise a dye.

57. The process of claim 56 further comprising the step of recovering the dye.

* * * * *